Oct. 30, 1962  H. E. FORESTER ETAL  3,060,827
VACUUM BRAKE FOR EXPOSURE DEVICE
Filed Sept. 16, 1960  9 Sheets-Sheet 5

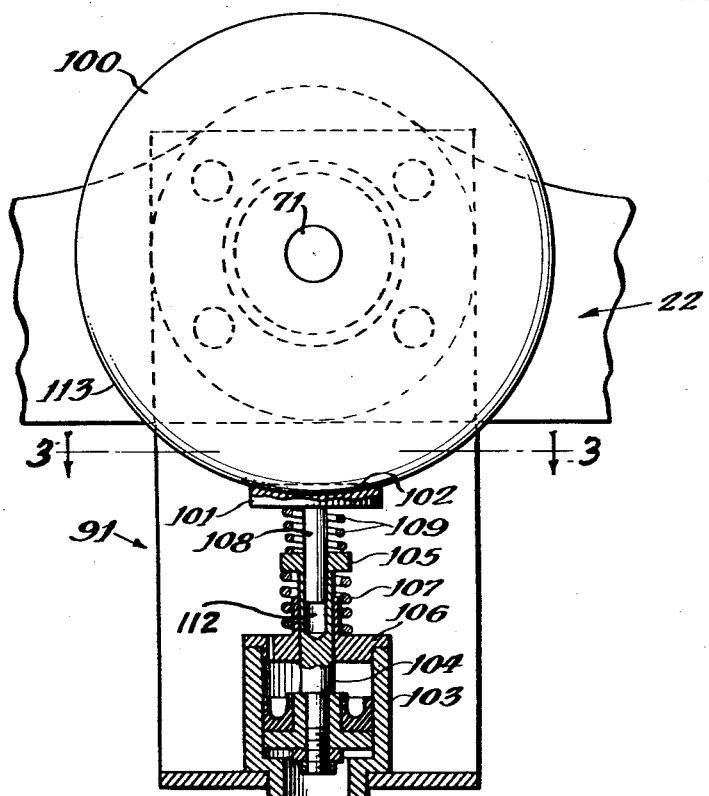
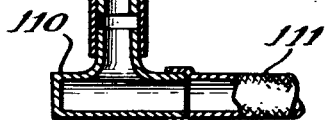
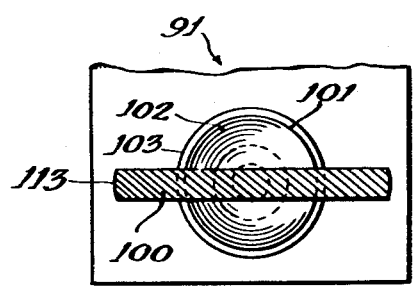
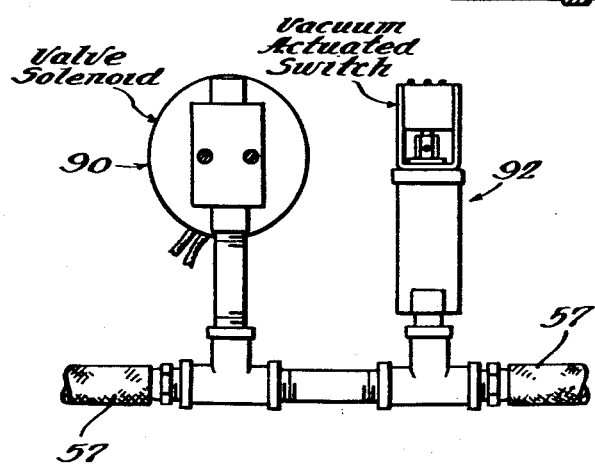
Inventors:
Harold Ernest Forester,
Maynard C. Gross,
Louis A. Smitzer,

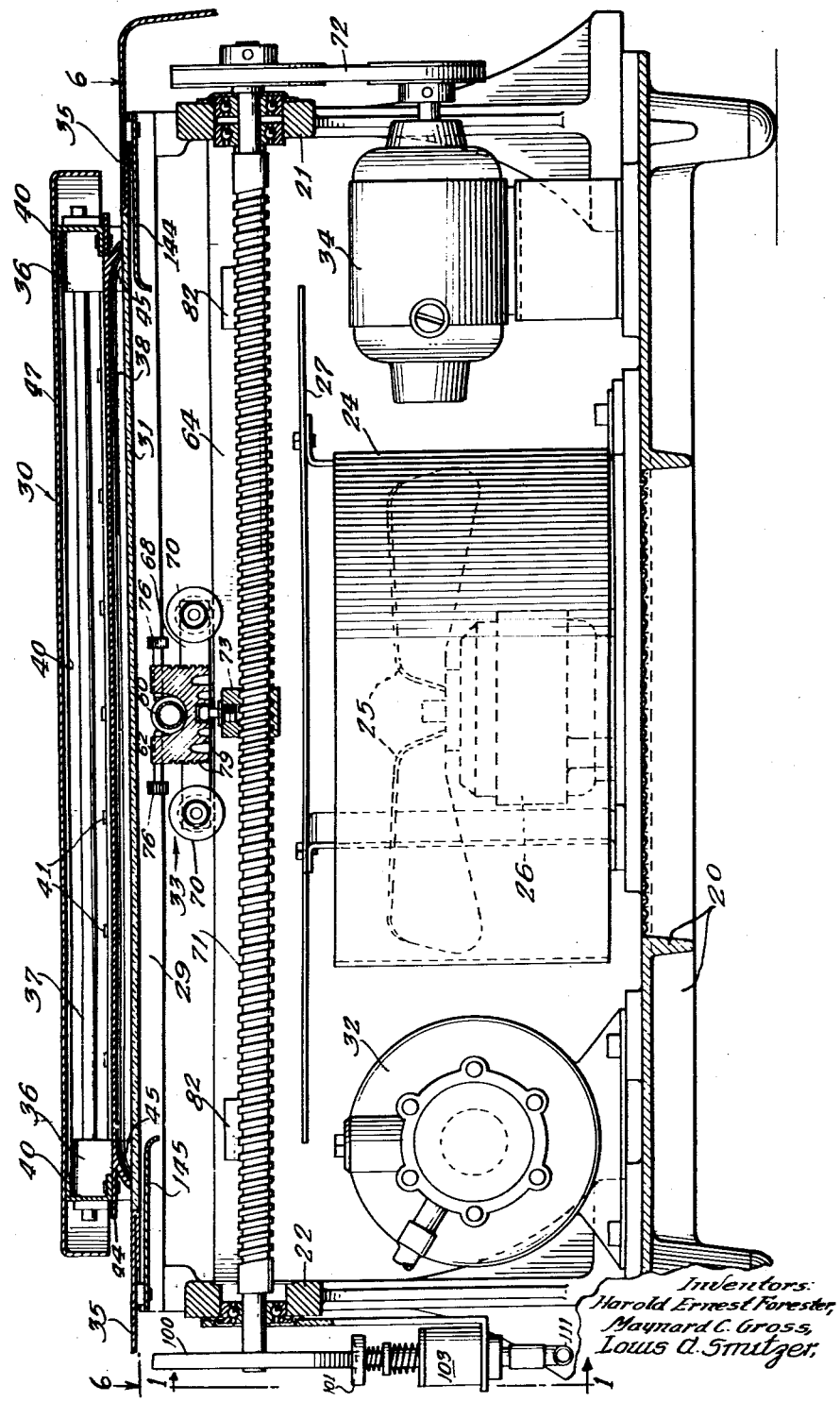

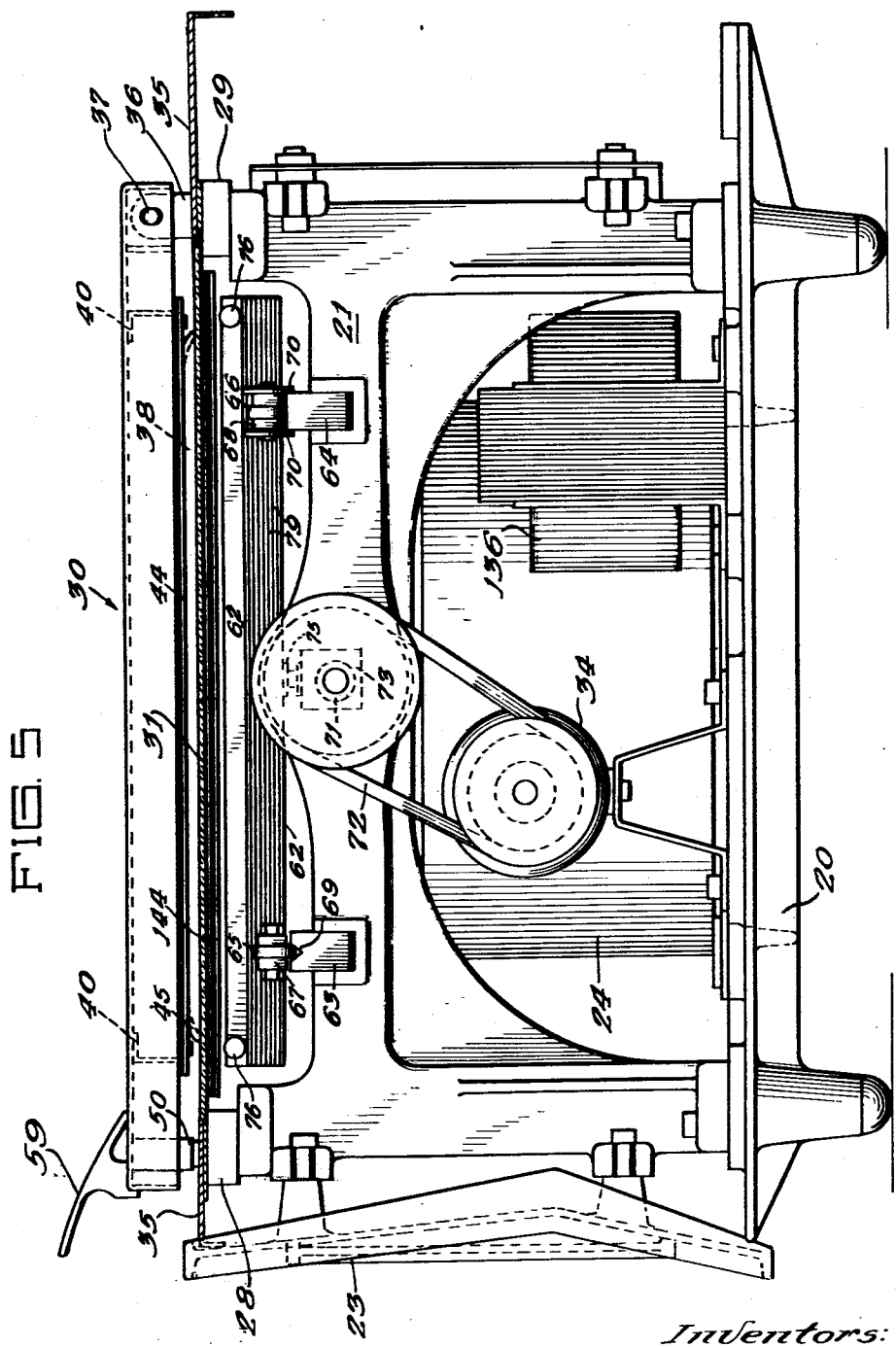

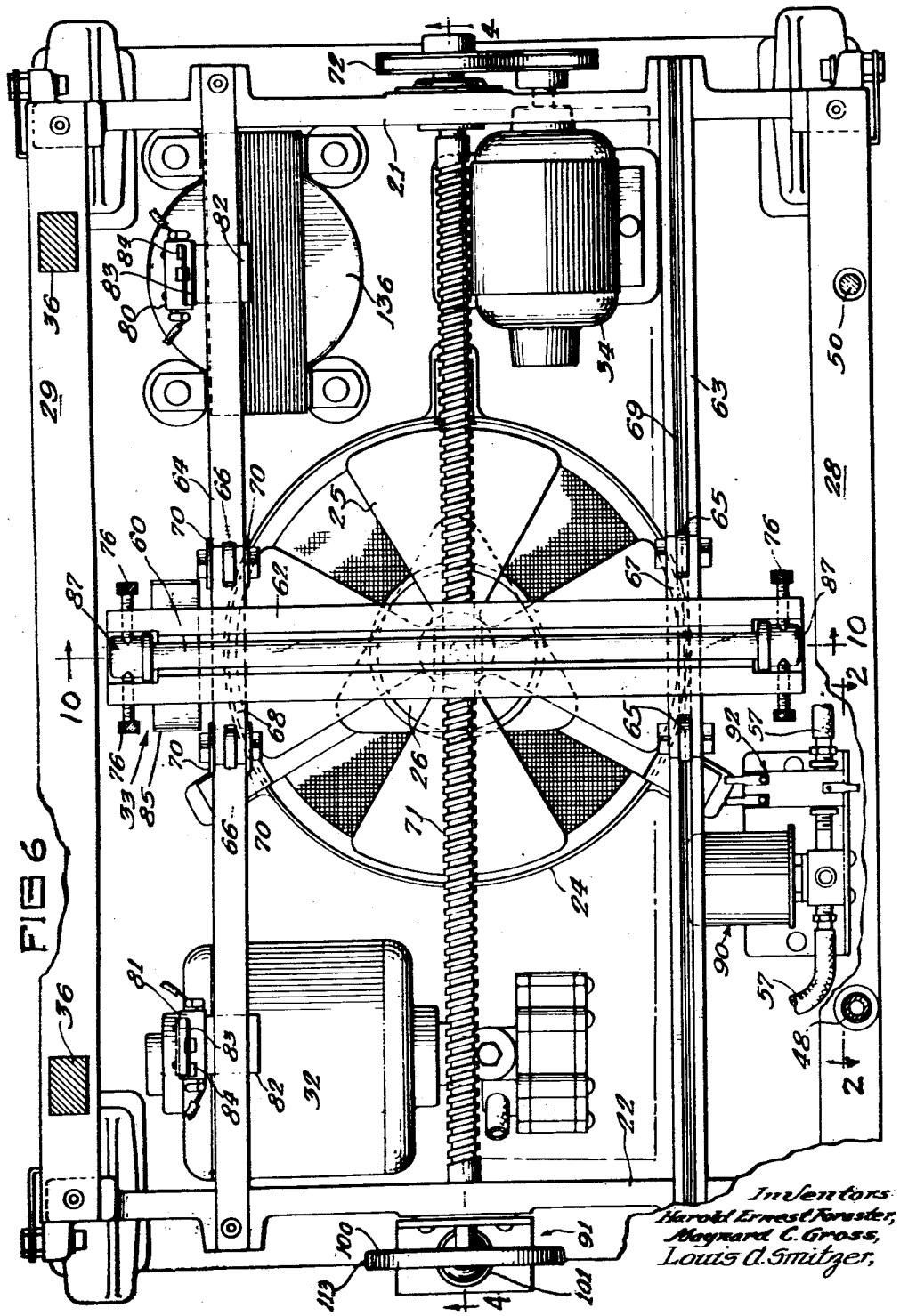

Inventors:
Harold Ernest Forester,
Maynard C. Gross,
Louis A. Smitzer,

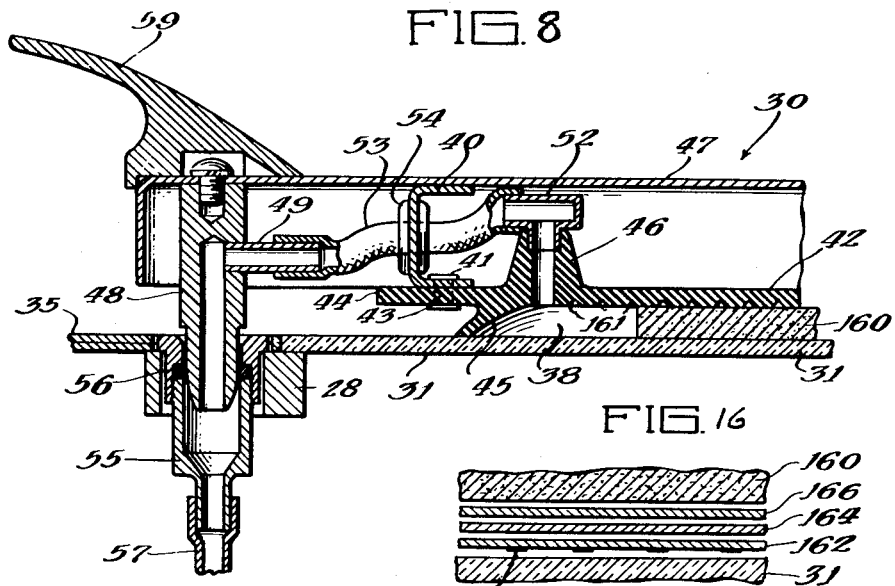
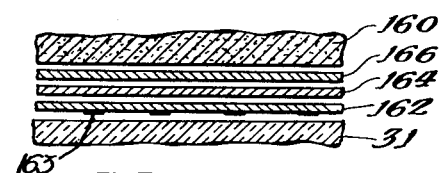
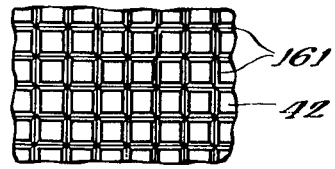
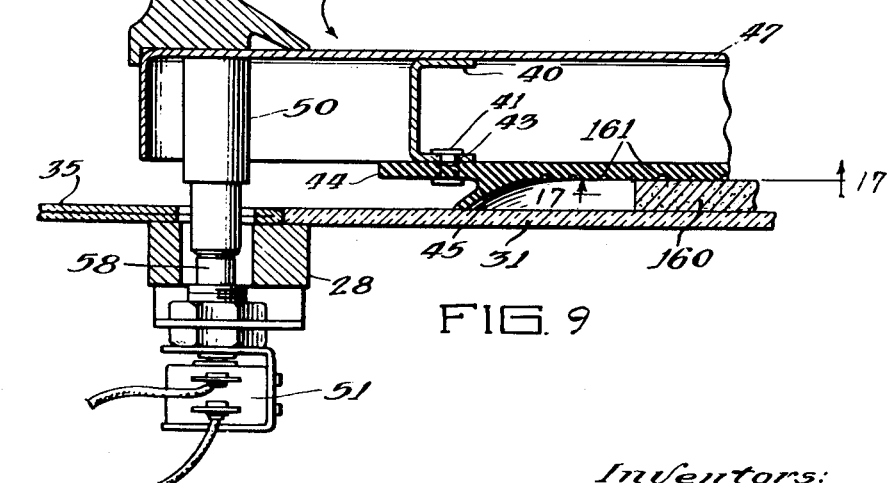

Oct. 30, 1962 H. E. FORESTER ETAL 3,060,827
VACUUM BRAKE FOR EXPOSURE DEVICE
Filed Sept. 16, 1960 9 Sheets-Sheet 7
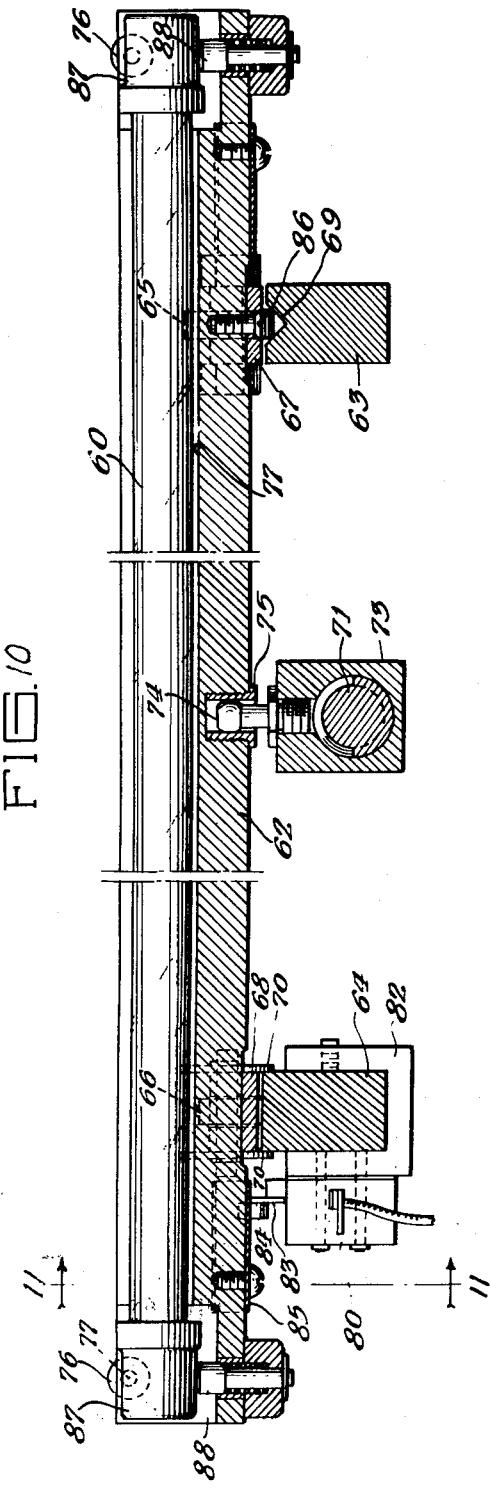
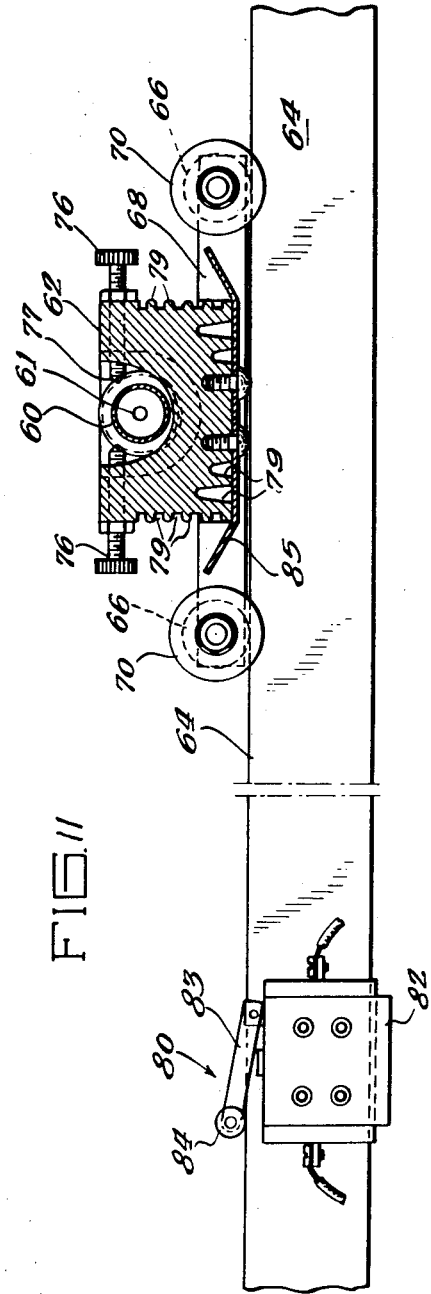
Inventors:
Harold Ernest Forester,
Maynard C. Gross,
Louis A. Smitzer Oct. 30, 1962 H. E. FORESTER ETAL 3,060,827
VACUUM BRAKE FOR EXPOSURE DEVICE
Filed Sept. 16, 1960 9 Sheets-Sheet 9
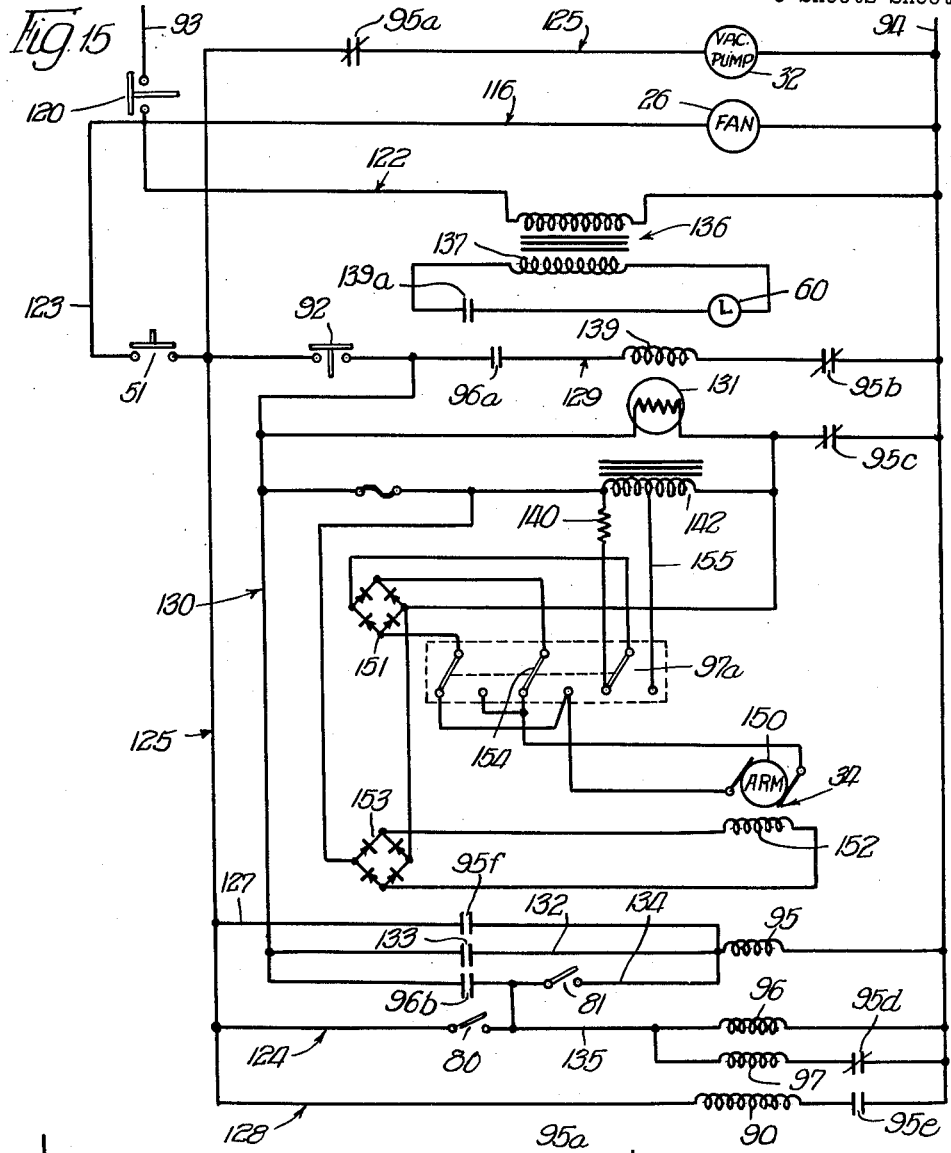
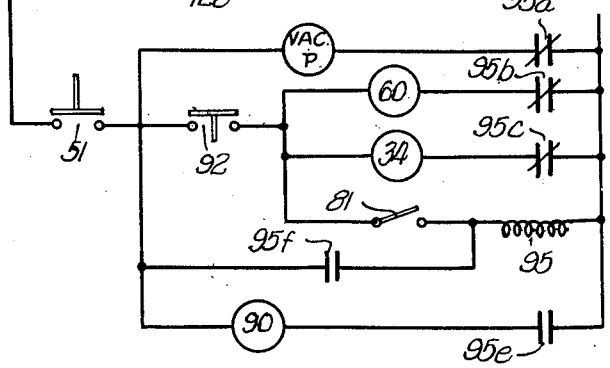
INVENTORS
Harold Ernest Forester,
Maynard C. Gross,
Louis A. Smitzer,

United States Patent Office 3,060,827
Patented Oct. 30, 1962

3,060,827
VACUUM BRAKE FOR EXPOSURE DEVICE
Harold E. Forester, Skokie, and Louis A. Smitzer and Maynard C. Gross, Chicago, Ill., assignors, by mesne assignments, to Bell & Howell Company, Chicago, Ill., a corporation of Illinois
Filed Sept. 16, 1960, Ser. No. 56,520
5 Claims. (Cl. 95—76)

The present invention relates to improved brake means for use in a vacuum frame type of printing mechanism.

In the vacuum frame type of printing mechanism having a traveling energy source in which certain of the functions are controlled by limit switches actuated by the carriage which conveys the energy source, overthrow of the carriage beyond the limit switch may cause recycling of the mechanism. Such action is undesirable, since the exposure device relies on the limit switches to de-energize the drive mechanism. Overthrow of the carriage should not take place because it upsets the focus settings of the energy source.

The braking mechanism must be easily maintained, inexpensive to construct and be free from mechanical failure. In addition the braking mechanism should have a high degree of reliability in performance.

It is an object of this invention to provide braking mechanism that is inexpensive to construct since it embodies relatively few parts and which will be high in reliability of mechanical performance.

Another object of the invention is to provide a braking mechanism which will be pneumatically actuated.

A further object of this invention is to provide braking mechanism which is applicable to a printing machine wherein the vacuum produced for holding the sheets during exposure is automatically released, but is equally applicable to a machine in which the vacuum is manually released.

It is another object of the present invention to provide a pneumatic braking mechanism which is energized from the vacuum system of a vacuum frame printer to the end that release of the vacuum will automatically actuate the brake.

A still further object is to provide in a device of this type an improved arrangement of frictionally engaging elements.

Still another object is to provide in a machine of the type described, braking mechanism which also includes means for applying a load or drag upon the rotating parts to improve uniformity of speed of rotation under varying operating conditions.

The term "vacuum frame" is generally applied in the photographic and analogous arts to indicate a device for maintaining two or more sheets in intimate contact with each other for print making purposes. The vacuum frame proper is removably mounted for cooperation with a transparent sheet supporting base, and includes a flexible blanket and a supporting frame therefor. The components of a vacuum frame type of exposure device, in addition to the vacuum frame and the transparent base, include a vacuum pump for exhausting the air from the space between the blanket and the transparent base, and a radiant energy source which is located on the opposite side of the transparent base from the vacuum frame. In some instances, the radiant source is a traveling energy source with the result that driving means must be provided for the same.

One of the features of such a machine is to provide a mechanism in which the forward and return movements of the traveling energy source are each utilized for carrying out certain phases of the exposure operation. Accordingly, the driving means must move the energy source at a uniform rate of travel underneath the glass surface. In order to accomplish this uniformity, it is necessary that the drive mechanism attain a uniform rate of speed almost instantaneously from a stop position and continue this rate of speed throughout the period of exposure and decelerating to zero speed in the shortest possible time.

Since both the forward and return movements of the traveling energy source are utilized for certain of the exposure operations, it is necessary that suitable braking action be applied at the precise instant in order that the switching actions taking place will be accurately timed for the most efficient and positive operation.

Other objects, features and advantages of the invention will become apparent as the description proceeds.

With reference now to the drawings, in which like reference numerals designate like parts:

FIGURE 1 is a transverse sectional elevation along line 1—1 of FIGURE 4 showing a preferred embodiment of braking mechanism coming within the invention;

FIGURE 2 is an elevational view taken along line 2—2 of FIGURE 6;

FIGURE 3 is a detail sectional view taken along line 3—3 of FIGURE 1;

FIGURE 4 is a longitudinal, sectional view taken along line 4—4 of FIGURE 6;

FIGURE 5 is an elevational view of the right hand side of the device as shown in FIGURE 4;

FIGURE 6 is a plan section taken along line 6—6 of FIGURE 4;

FIGURE 8 is a section along line 8—8 of FIGURE 7 showing the coupling in the vacuum line;

FIGURE 9 is a section along line 9—9 of FIGURE 7 showing the cover switch;

FIGURE 10 is a longitudinal section along line 10—10 of FIGURE 6 showing the energy source and the carriage mounting therefor;

FIGURE 11 is a transverse section along line 11—11 of FIGURE 10;

FIGURE 14 is a wiring diagram showing certain elements of the control circuit;

FIGURE 15 is a wiring diagram showing the complete electric circuit for controlling operation of the exposure device;

FIGURE 16 is an enlarged view showing the relationship of the superimposed sheets to each other and to the adjacent parts, and FIGURE 17 is a fragmentary bottom view of the resilient blanket showing the grooves.

Figure 7:
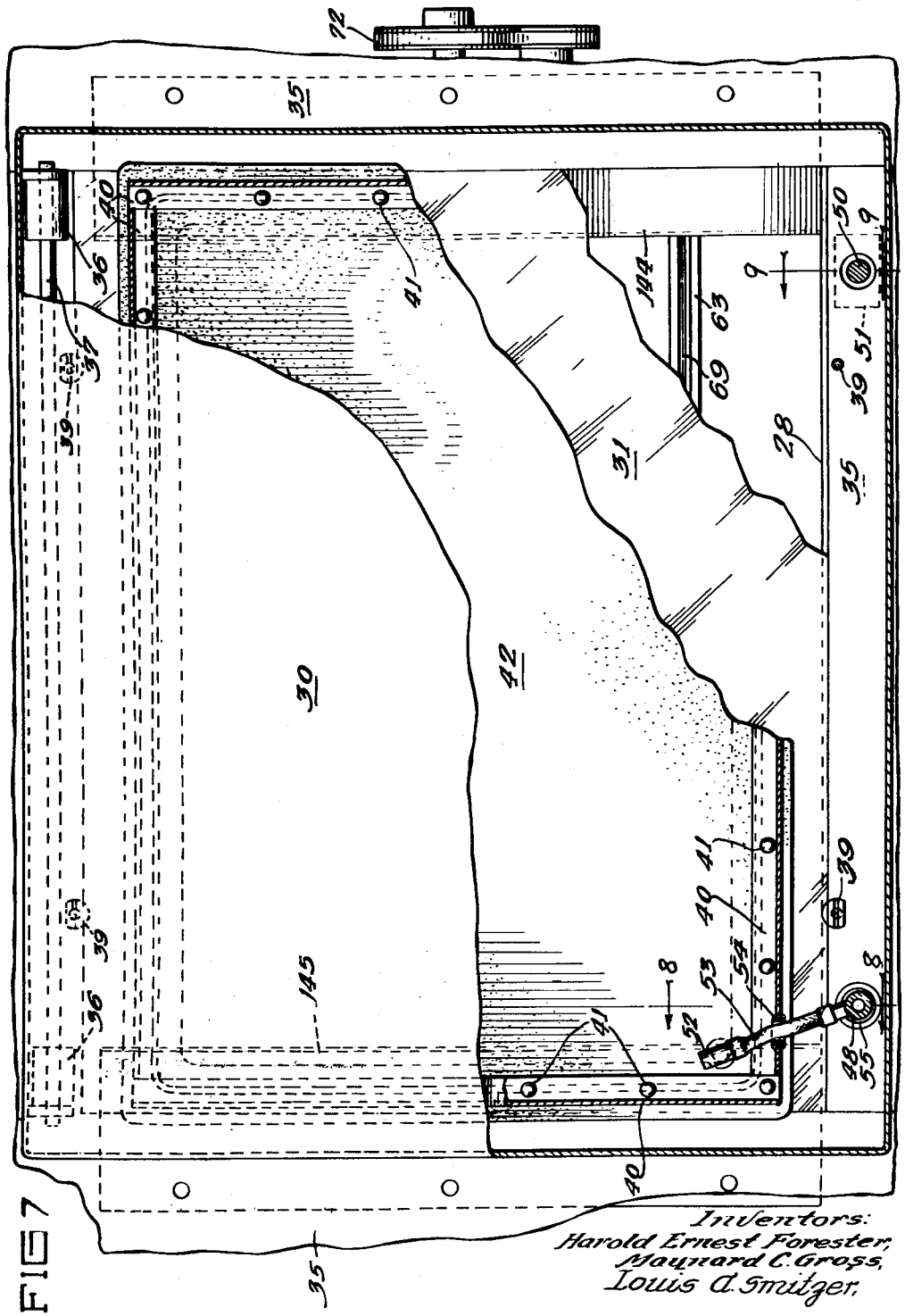
FIGURE 7 is a plan view, partially in section, showing the cover, the resilient blanket and the transparent sheet supporting plate.

The particular embodiment of exposure device selected for illustrating the invention is the same as disclosed in the copending application of Forester and Gross, Serial No. 815,113, filed May 22, 1959, now Patent No. 3,007,390, and entitled "Exposure Device." The electric circuitry as shown and described herein for controlling operation of the said exposure device is disclosed and claimed in the copending application Serial No. 56,480, filed September 16, 1960, in the names of Harold E. Forester, Louis A. Smitzer and Maynard C. Gross, as inventors.

General Organization

The frame work of the device, as shown in FIGURES 1, 2 and 3, comprises a base 20 and a right and left end members 21 and 22. The framework is intended to be included in a housing which is not shown, except for a decorative front grill 23, which may be suitably secured to the end members. Mounted over a suitable opening in the base 20 is a fan housing 24, which includes a fan 25 and a fan motor 26 and which supports a baffle 27. Connecting the upper edges of the end members 21 and 22 are front and rear support bars 28 and 29. The principal elements of the device comprise a hingedly mounted vacuum frame 30 providing a cover below which is disposed a transparent sheet supporting base 31, such as a glass plate. Within the hingedly mounted vacuum frame is provided the tensioned rubber blanket 42. Supported by the framework there is an electrically operated vacuum pump 32, a traveling radiant energy source 33, and the drive motor 34 as shown in FIGURE 3. The front and rear edges of the glass plate 31 rest on the support bars 28 and 29, and may be removably secured thereto by suitable clips, not shown. Filler strips 35 also overlie the support bars and abut the glass plate 31 so as to provide a flush working surface, the filler strips also extending along the side edges of the glass plate and forming a continuation of the housing. Lugs 36, as shown in FIGURES 2 and 4 project upwardly from bar 29 and extend through the back filler strip and provide means on which the vacuum frame may be hingedly mounted by a pin 37.

The Vacuum Frame

The construction of the vacuum frame is shown in FIGURES 4, 5 and 6, and comprises a rectangular frame member 40 comprised of U-shaped strips. A series of headed pins or buttons 41 depend from the lower surface of the frame and the resilient blanket 42, having correspondingly located holes 43 is mounted on the pins 41. The holes 43 are spaced inwardly from the marginal portions 44 to facilitate manipulation of the blanket 42 incident to installation. The blanket 42, which is preferably formed of rubber or a similar material, in its relaxed form is considerably smaller than the rectangular frame. Thus, when mounted, the blanket is under substantial tension. The button and hole arangements provide a convenient mounting means for the blanket, and at the same time, they provide the means for uniformly mounting the blanket under a condition of tension without the necessity of any additional retaining strips or back support. The mounting just described uniquely integrates the vacuum blanket with the hingedly mounted lid.

Disposed just inwardly from the series of holes 43 and extending around all four sides of the blanket is a continuous lip 45, which is adapted to engage the glass plate 31 to provide a vacuum seal, the lip extending outwardly and downwardly as shown in FIGURE 8. A nipple 46 is formed in the blanket at a point adjacent the lip 45. The frame 40 and blanket 42 are mounted within an enclosure 47 which is provided with a handle 59 at its front edge so that the vacuum frame can be raised and lowered. The front end of the enclosure is provided with a downwardly extending pin, the lower end of which is received within the front support bar 28. This pin 50 is an actuating pin for engaging the plunger 58 of a cover switch 51 which is secured to the underside of the front support bar 28.

Figure 12:
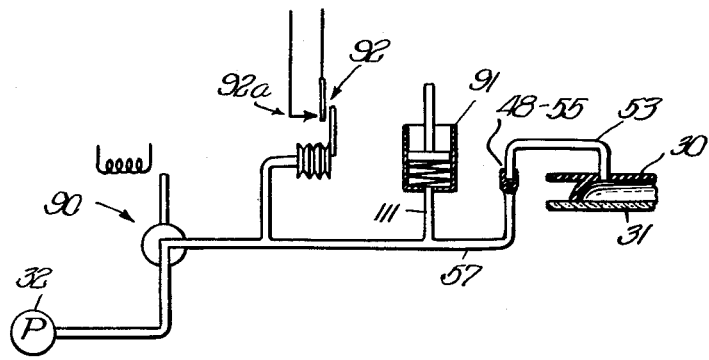
FIGURE 12 is a diagram illustrating the vacuum system.

The nipple 46, which is formed in the blanket at a point adjacent the lip 45 is connected to the flexible tube 53 which then extends rearwardly inside the lid and passes through the web of the frame member 40 and passes into the framework through filler strip 35 to communicate with tube 57, which constitutes the vacuum line connected with the vacuum pump 32, as shown in FIGURE 12.

In operation, after the superimposed sheets have been placed on the glass plate 31, the vacuum frame 30 is lowered into its operative position as shown in FIGURES 4, 5 and 6, the lip 45 forming a seal for the space 38 which is enclosed by the blanket 42 in the glass plate 31. The closing of the cover starts the vacuum pump 32 and the vacuum created within the space 38 effectively locks the parts together until the vacuum is atuomatically released by means hereinafter described.

The Limit Switches

A pair of limit switches 80 and 81 are mounted by means of brackets 82 on the rear rail 64, as shown in FIGURES 6, 10 and 11. Each limit switch is provided with an actuated lever 83, which terminates in a roller 84. The actuating levers preferably are pivoted at their inner ends, with respect to the medial plane of the machine, and are depressed by a shoe 85, which is carried on the lower surface of the carriage 62, the cam surface of the shoe engaging one or the other of the rollers 84. As will hereinafter be described, actuation of the right hand limit switch energizes the lamp 60 and the reverse drive of motor 34. The left hand limit switch de-energizes both the lamp 60 and drive motor 34 and then terminates the cycle.

The Vacuum System

The elements included in the vacuum system as shown in FIGURE 12, include in addition to the vacuum pump 32 and the vacuum frame 30, a two-way valve 90, a vacuum actuated brake 91, and a pressure responsive switch 92. After the pump 32 has been energized, and after a predetermined degree of vacuum has been built up, the pressure responsive switch 92 closes, and initiates the exposure operation. At the conclusion of the exposure operation, the vacuum release solenoid valve 90 is energized to release the vacuum, thus permitting the cover to be opened. The vacuum brake 91 is actuated when the vacuum is released to prevent overthrow of the carriage 62 beyond the limit switch 81, as will hereinafter be pointed out.

As shown in FIGURE 14, the closing of the cover switch 51 energizes the vacuum pump 32 and conditions the branch circuits which include the pressure responsive switch 92 and the vacuum release solenoid valve 90. Operation of the pressure responsive switch 92 starts the motor 34 which operates with the fixed resistance 140 in circuit as shown in FIGURE 15. The motor drives the lamp source unlit on a forward pass at a rate of traverse which is determined by the resistance 140. The cover switch also conditions the left and right limit switches 80 and 81.

As the carriage begins its forward pass, the limit switch 81 opens. The right hand limit switch 80 is closed as the lamp source completes the forward pass. Operation of limit switch 80 energizes the reversing relay 97, which breaks the circuit to the fixed resistance and transfers the current to the variable transformer 142. The unidirectional relay 96 is also energized by the closing of the limit switch 80, as well as the relay 139, which lights the lamp 60 through the step-up transformer 136 since contactor 96a is now closed. The limit switch 80 is opened when the lamp begins its return exposure traverse. However, the unidirectional relay 96 and the reversing relay 97 remain energized by reason of a holding circuit which is closed by contact 96b. At the end of the return pass, the carriage closes the limit switch 81, which energizes the master relay 95, which in turn opens contacts 95a, 95b, 95c and 95d, to de-energize respectively the circuits including the vacuum pump 32, the lamp 60 and the motor 34. The relay 95 also closes contact 95e to energize the circuit including the vacuum release solenoid valve 90, thus releasing the vacuum to permit the opening of the vacuum frame 30. The opening of the vacuum frame opens the cover switch 51 and de-energizes all circuits.

Vacuum Brake

The limit switch 80 is actuated by the carriage as it reaches the end of its initial or forward traverse beneath the transparent support base. In this initial traverse, the lamp 60 is not energized but the carriage is located at the extreme right hand position in preparation for making its return pass or exposure traverse.

As the carriage reaches the right hand side of the machine, it will close limit switch 80. This, in turn, energizes the reversing relay 97 which causes the drive motor to reverse rotation. The electrical circuitry which accomplishes this control and other controls will be discussed later in greater detail.

It would appear that right at this point in the travel of the carriage through the first step of its cycle that the problem of stopping the carriage would have to be overcome in order that successful operation be achieved. However, a braking mechanism is, in effect, present at this point in the cycle by virtue of the reversal which takes place in the drive motor causing the carriage to stop and immediately reverse its direction. Thus, a dynamic braking action is accomplished by the action of the reversing relay, reversing the direction of the drive motor which, in turn, sends the carriage back on its exposure trip.

As pointed out, as soon as the carriage reaches the right hand terminus on the first step of its cycle, it closes the limit switch 80, which energizes the reversing relay and causes a reversal in the rotation of the drive shaft causing the carriage to immediately change direction. Therefore, no opportunity is afforded for the carriage to override the limit switch due to any inertia of the carriage carrying it beyond this point, since the motor stops only to reverse direction.

The carriage begins a return pass with the lamp now energized so that exposure of the superimposed sheets will take place on this return pass. It is on this return pass that the problem of effectively stopping the carriage must be reckoned with. The carriage, upon reaching the end of the exposure pass, will close limit switch 81, which de-energizes the motor. Due to the inertia which has been imparted to the mechanism, the carriage will continue for a short distance beyond this limit switch before it comes to a stop.

Movement beyond the limit switch would cause the switch to open again and will send the carriage into the framework of the machine causing damage to the drive nut, as well as disturbing the focus of the lamp in the carriage. It would appear that the travel might be extended for a short distance and still maintain contact with the limit switch, in order that the inertia force of the carriage might dissipate itself and so come to a stop. This would result in a larger machine and generally does not present a satisfactory solution to the problem.

The braking means shown in FIGURE 1 effectively provides for overcoming the inertia of the drive screw as the motor 34 ceases to operate when the carriage closes the limit switch 81. The brake means provided is best shown in FIGURES 1, 3, 4 and 6. The left end of the drive screw 71 is provided with a disc 100 of suitable friction material. Beneath the disc is located vacuum brake 91, which carries a brake shoe 101 in the form of a horizontal disc having a spherical upper surface 102.

The vacuum brake comprises a cylinder 103 and a piston 104, the upper end of which terminates in a flange 105. The piston is slidably mounted in a vented closure 106 for the upper end of cylinder 103. An actuating spring 107 is confined between the flange 105 and the closure 106. A stem 108 is slidably mounted in a bore 112 formed in the upper end of the piston, the shoe 101 being carried thereby. A loading spring 109 surrounds the stem and is confined by the shoe and the piston flange 105 and tends to urge the brake shoe into contact with the disc 100 at all times to impose a drag on the drive mechanism. The stem 108 may be eliminated and the shoe mounted directly on the piston rod. This, in effect, eliminates the drag effect when such is not required.

The shoe 101 and stem 108 are free to rotate about a vertical axis so that the spherical surface 102 will be maintained, the edge 113 of the disc tending to conform itself to the surface 102 to provide maximum contact area. The lower end of the cylinder 103 terminates in a fitting 110 to which a tube 111 is connected, the tube 111 communicating with the vacuum line 57 as shown in FIGURE 12.

In operation the shoe 101 will continue to exert a drag on the disc 100 so that the drive mechanism is operating against a slight friction load. It was found that greater consistency of traverse was accomplished particularly when the contacting parts begin to wear. This drag has a compensating effect in stabilizing the speed. The shoe is contoured to a concave shape to accommodate the radius of the disc and this feature results in the two parts always being self-aligning, assuring maximum surface contact.

*Operation of the Vacuum Brake*

When the vacuum has been established, the piston 104 will be displaced downwardly against the bias of the actuating spring 107, thus maintaining the brake inoperative. Upon release of the vacuum, the actuating spring 107 urges the brake shoe 101 upwardly into engagement with the disc 100, causing the drive screw 71 and the driving mechanism to come to a smooth stop, the force being transmitted from the piston to the brake shoe by the abutting engagement of the bottom of bore 112 with the bottom of the stem 108. However, even when the parts are in the retracted position as shown in FIGURE 1, the brake shoe 101 maintains a slight drag on the driving mechanism by virtue of the loading spring 109. This drag serves to mask minor variations in the load which might effect the uniformity of the rate of traverse of the carriage, hence promoting uniform exposure. In addition to the wear of the bearings, it has been found that the condition of the lubricant on the drive shaft and the flexibility of the drive motor had been compensated for by this drag effect.

*The Traveling Energy Source*

A suitable source of radiant energy is provided which, in the embodiments shown, comprises a filament type lamp 60, which is located beneath the glass plate 31. The tubular lamp is provided with a linear filament 61, thus providing a linear energy source which is focused on the characters of the original 162. The exposure operation is effected by causing the energy source to travel between two terminal positions located at opposite ends of the glass plate to each other, and control of exposure is effected by regulating the rate of traverse. According to the present invention, therefore, the driving mechanism for the traveling energy source serves as the timing means which controls the pressure. Means shown in FIGURES 10 and 11 are provided for mounting the lamp 60 so that the filament 61 thereof will be maintained in a common plane throughout its travel to provide accurate focusing, and so that the rate of traverse will be uniform, thus providing for uniform exposure.

The lamp 60 is mounted in a carriage 62, which travels on transversely disposed front and rear rails 63 and 64, the latter being supported by the end members 21 and 22. The carriage 62 is supported by means of front and rear trucks 67 and 68, each of which are provided with wheels 65 and 66, respectively, which ride on the rails 63 and 64.

In order to maintain the carriage perpendicular to the line of travel, it is secured at one end to the front truck 67, and the front truck, in turn, is designed to maintain parallelism with the front rail 63 to a high degree of accuracy, this being accomplished by means of a V-shaped groove 69, in which the front wheels 65 ride as shown in FIGURE 10. The front truck 67 is secured to the carriage by one or more screws 86. It will be observed that the lower surface of the front truck clears the upper surface of the rail 63, the screw 86 also serving to adjust this clearance so that positive contact with the rail is made only by the corner edges of the front wheel 65.

The carriage 62 at its rear end is not secured to the truck 68, but merely rests thereon so as to permit the small amount of sliding action which is necessary to accommodate thermal expansion of the carriage. In order to maintain the truck 68 in position with the rear rail 63, the wheels 66 may be provided with end flanges 70. The flanged portions of the wheels straddle the rear rail so that the movement of the rear trucks thereon is essentially parallel to the rear rail.

A drive screw 71 is journalled in end members 21 and 22 and is driven from the motor 34 by means of a belt and pulley arrangement 72. A nut 73 mounted on the screw is shown in FIGURE 10 and projecting from the upper surface thereof is a ball pin 74 which is received within a hardened bushing 75, located in the lower surface of the carriage 62. Thus, the carriage is moved transversely by rotation of the drive screw 71, and the ball pin and bushing arrangement 74 to 75 permit a limited amount of movement of the carriage in the forward and backward direction to accommodate thermal expansion of the carriage.

*The Control Circuit*

The control circuit is diagrammatically illustrated in FIGURE 15, a particular operation of which has been outlined in connection with the description of FIGURE 14. Reference numerals 93 and 94 designate the line conductors, and the main switch 120 is interposed in conductor 93 to turn the device off and on.

There are three main circuits connected between conductors 93 and 94 and in parallel with each other, namely the fan circuit 116 which includes the fan motor 26, the lamp power circuit 122 which includes the primary of the transformer 136, and an operating circuit 123, which includes the cover switch 51 and four branch circuits which are connected in parallel to each other and in series with the cover switch 51. The four branches of the operating circuit are the reversing relay circuit 124; the vacuum pump circuit 125, which includes the electrically operated vacuum pump 32; a control circuit 126 which includes the pressure responsive switch 92 and four branch circuits which are controlled thereby and a vacuum release circuit 128 which includes a vacuum release solenoid 90.

The four branch circuits of the control circuit 126 comprise a lamp control circuit 129, which includes a lamp relay 139, a motor circuit 130 which includes a fixed resistance, a variable transformer, the direct current drive motor 34 and a rectifier for the armature and field circuits respectively which provides direct current to the field circuits and armature circuits, a circuit for the bimetallic heating element 131 having a switch 133 and the relay circuit 132 which includes the relay coil 95 for actuating the normally closed contacts 95a, 95b, 95c and 95d and the normally open contacts 95e and 95f. The relay circuit 132 includes two branch circuits which are connected parallel to each other, namely a first limit switch circuit 134 which includes limit switch 81, and a second limit switch circuit 135 which includes limit switch 80. The limit switch circuits 134 and 135 are conditioned by the pressure responsive switch 92. The limit switch circuit 135 is energized when the right hand limit switch 80 is closed by the carriage, and thus relay 96 and relay 97 are energized. With respect to the unidirectional relay 96, the same controls two normally open contactors, namely 96a and 96b, the former having a series relation with the lamp relay 139, and the latter being connected in series with the limit switch 81 and master relay 95. Thus the lamp 60 is not energized until contactor 96a is closed. The closing of contactor 96b conditions circuit 134 for energization when the limit switch 81 is closed. The reversing relay 97 controls only one contactor, namely 97a.

Operation of the exposure device is initiated by closing of the switch 120 which energizes the fan motor 26 and conditions the lamp power circuit 122 and the operating circuit 123. The lamp power circuit includes the lamp 60 and the normally open contactor 139a, which is closed upon energization of the lamp control relay 139. The lamp 60 is connected into the secondary circuit 137 of the power transformer 136. The said relay 139 remains de-energized as long as contactor 96a is open, and as explained, the said contactor is closed when the carriage completes its initial pass from left to right which results in the closing of limit switch 80 and energization of relay 96. Closing of the vacuum frame 30 actuates the cover switch 51 to energize circuits 125, starting operation of the vacuum pump 32, and to condition circuits 126, 127, 130 and 132 for subsequent operation.

Assuming that the carriage 62 is in its extreme left hand position as viewed in FIGURE 6, it will be understood that the limit switch 81 will be closed and as described, the fan is operating and the vacuum pump is in the process of exhausting the space 38 to a pressure below atmospheric. As soon as a predetermined vacuum has been reached, such as 23 inches of mercury, at which the machine may be designed to operate, the vacuum responsive switch 92 will close, thereby energizing the drive motor 34 which now is operative for actuating the carriage 62 causing the same to travel from its extreme left hand position, FIGURE 3, to its extreme right hand position, thus completing an initial or a forward pass. The traverse of the carriage in this forward direction is governed by the fixed speed of the motor and the motor speed is controlled by the fixed resistance 140 now connected in circuit with the motor. Also, as the vacuum builds up and closes the vacuum responsive switch 92, the thermo-timer 131 is energized and the same begins its cycle. Initial movement of the carriage in the forward direction opens the limit switch 81 which, however, has no effect on the operation of the parts, since the switch circuit 134 is open by reason of contactor 96b being open.

Figure 13:
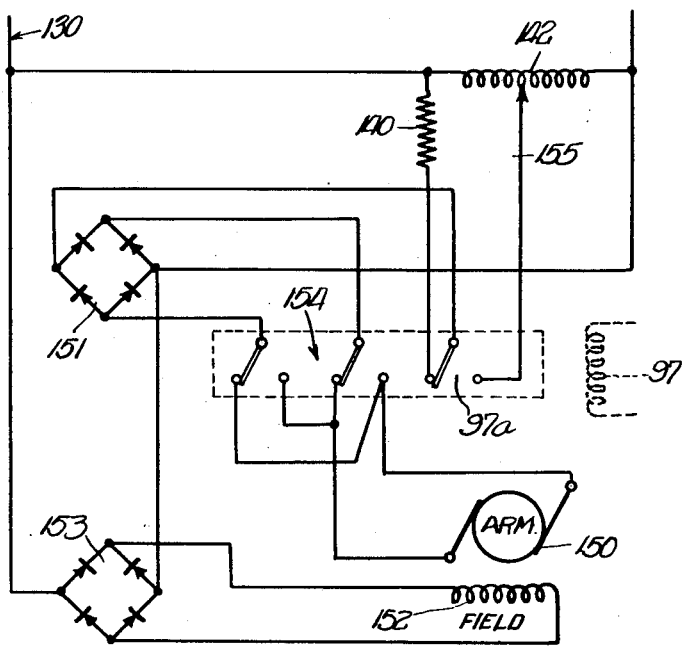
FIGURE 13 is a diagram showing the motor circuit and associated elements for controlling operation of the driving means.

The carriage completes its travel from left to right on its initial pass and upon reaching its right hand position the carriage actuates limit switch 80 to close the same. This energizes unidirectional relay 96 and also the reverse relay 97. With the energization of relay 96 the contactor 96a is closed so that relay 139 is energized to, in turn, energize the lamp 60. Contactor 96b is also closed and accordingly a holding circuit is completed for maintaining relay 96 and relay 97 energized, even though the limit switch 80 may be opened, which, of course, takes place as the carriage begins its travel in a return direction. Energization of the reversing relay 97 actuates contactor 97a, FIGURE 13, so that the same disconnects the fixed resistance 140 from the circuit of motor 34 and connects into said motor circuit the variable transformer 142. Actuation of said contactor 97a also reverses the direction of current flow to the armature of said motor 34. The variable transformer 142 controls the speed of the motor and thus the rate of travel of the carriage on its return and exposure pass.

Upon completion of the said return and exposure travel of the carriage, the same will contact the left hand limit switch 81 to close the same and as a result the master relay 95 is now energized through circuit 134, since both the limit switch 81 and the contactor 96b are closed. Energization of the master relay 95 results in the opening of the normally closed contacts 95a, 95b, 95c and 95d. Accordingly the vacuum pump motor is de-energized and the vacuum pump is caused to stop. The lamp relay 139 is also de-energized due to opening of contactor 95b so that the lamp is extinguished. The motor 34 is caused to stop due to the fact that the motor circuit is opened by the contactor 95c, and with the opening of contactor 95d the reversing relay 97 is also de-energized.

Along with the energization of master relay 95 two normally open contactors are closed, namely 95e and 95f. The former closes circuit 128 to energize the solenoid valve 90 and as a result the valve operates to release the vacuum within the vacuum frame 30. This action initiates operation of the vacuum brake 91 which facilitates stopping of the motor as soon as the same is de-energized. Also, release of the vacuum within the frame will cause opening of the vacuum switch 92 which brings the space 38 to an atmospheric condition and allows the frame to be lifted. It will be appreciated that the opening of vacuum switch 92 would de-energize the master relay 95, and hence tend to cause re-cycling if the cover switch 51 is not immediately opened. Such would be the case since the vacuum pump 32 and the reversing relay 97 would be operative for another forward pass of the carriage as soon as relay 95 is deenergized. Therefore, a holding circuit 127 is provided having a connection in parallel with the vacuum switch. With the energization of relay 95 the normally open contactor 95f is closed to establish the holding circuit 127 thereby maintaining the master relay 95 energized until the frame 30 is lifted to open the cover switch 51. The fan 26 continues to run until the power switch 120 is opened.

In the event of motor failure or the occurrence of other conditions which would tend to delay the completion of the cycle and hence possibly retain the lamp in an energized condition for an undue period, the contactor 133 of the thermo-timer 131 will close and energize the master relay 95. Accordingly, energization of the master relay will terminate the exposure operation and thus the parts are prevented from damage such as might be due to excessive heat.

As shown in FIGURE 12 the drive motor 34 is a direct current motor operating on power supplied by the motor circuit 130. The motor comprises an armature 150 which is connected across the terminals of a full way rectifier 151. The shunt field 152 of the motor is connected across the terminals of a full way rectifier 153. The reversing switches 154 and the contactor 97a are provided for reversing the polarity of the armature 150 and for switching the fixed resistance 140 and the variable transformer 142. Variable speed and hence exposure control is obtained by regulating the voltage impressed upon the armature. This is accomplished by the variable transformer which has a sliding tap identified by numeral 155.

*Operation*

When it is desired to make a printed copy, the vacuum frame 30 is first raised and the original and copy and transfer sheet are superimposed on the glass plate 31 in the desired relationship. After the sheets have been positioned, the vacuum frame 30 is lowered, thus providing a seal around the entire superimposed assembly with the exhaust opening located inside the space 38. The exhaust line is connected to the nipple from the vacuum pump 32 through which the air is exhausted as the pump is started. As soon as the proper degree of vacuum has been reached, the pressure responsive switch 92 will close, thereby causing the carriage to move from the left to right in a forward pass. This pass is accomplished at a traverse speed which is fixed in accordance with the fixed resistor in the motor circuit. As the carriage reaches the right hand position, the lamp is energized and the rotation of the motor is reversed and the current takes its alternate pass through the variable transformer which determines the exposure pass of the energy source as preset by the operator of the device. This exposure control is effected by shifting the sliding tap 155 of the transformer 142 to control the rate of traverse.

At the conclusion of the exposure operation, the vacuum frame is released and the operator raises the vacuum frame without disturbing the superimposed sheets so as not to prematurely cause any separation between the transfer and copy sheet. The ability to raise the vacuum frame and not disturb the sheets is the result of the unique tension mounting of the blanket and the use of the interposed porous cushion. Upon raising the vacuum frame 30, all the circuits are conditioned for a subsequent operating cycle by the opening of the cover switch 51.

Although the preferred embodiment of this invention is shown and described herein, it will be obvious that various modifications and changes may be made in the construction shown without departing from the spirit of the invention as pointed out in the appointed claims.

What is claimed is:

1. In a vacuum frame type of exposure device embodying a vacuum frame, a traveling energy source, driving means therefor, and a vacuum pump, braking means for said driving means comprising, a cylinder with a fitting at one end connecting with the vacuum pump for evacuating the cylinder when the pump is operative, a piston and piston rod mounted within said cylinder, said rod extending through an air tight closure to said cylinder and terminating in a flange, said flange and piston rod having a central bore formed therein, a brake shoe affixed to a stem, said stem being slidably mounted in said flange and piston rod bore, a first spring surrounding the portion of the piston rod outside the cylinder and confined between said cylinder closure and piston rod flange for urging said piston in the direction of the closure, and a second spring surrounding said brake shoe stem and confined between the flange and the brake shoe thereby urging said shoe in a direction axially and outwardly of the bore, whereby upon the release of the vacuum within the cylinder said piston is biased in a direction toward the closure causing said brake shoe to move in a direction outwardly away from the closure.

2. In a vacuum frame type of exposure device embodying a vacuum frame, a traveling energy source, driving means therefor, and a vacuum pump, braking means for said driving means comprising, a cylinder fitted at one end to a vacuum line; a piston and piston rod in said cylinder, said piston extending through an air tight closure at the other end of said cylinder, said piston rod terminating in a flange, said flange and piston rod having a central bore formed therein, a brake shoe affixed to a stem, said stem being mounted for free slidable and rotatable movement in said bore, said brake shoe having an arcuate contour for engaging a circular surface; a first spring surrounding the portion of the piston rod outside the cylinder and confined between said cylinder closure and said flange for urging said piston in the direction of the cylinder closure, and a second spring surrounding said brake shoe stem and confined between said flange and brake shoe for urging said stem out of the bore, whereby the brake shoe is resiliently urged in a direction toward the circular surface.

3. In a vacuum frame type of exposure device, the combination with a vacuum line and a rotatable disc, of friction braking means for the rotatable disc, said means including a cylinder connected at one end to the line and having a closure at its opposite end, a piston within the cylinder, a piston rod fixed to the piston and extending through an opening in the closure, resilient means in surrounding relation with the piston rod and being confined between the closure and a flange on the end of the piston rod, a brake shoe having a stem portion, said piston rod having a bore for receiving the stem portion whereby the brake shoe is slidably supported for independent movement axially of the piston rod, additional resilient means surrounding the stem portion and being confined between the flange and the brake shoe, whereby the brake shoe, when atmospheric conditions prevail in the vacuum line, is yieldingly forced into contact with the rotatable disc by the combined action of both said resilient means to apply a frictional braking action to the disc, said piston being retracted when a vacuum is produced in the vacuum line, thus rendering the first mentioned resilient means ineffective in forcing the brake shoe towards the disc, so that under such conditions of vacuum only the additional resilient means is effective for frictionally braking the disc.

4. In a vacuum frame type of exposure device, in combination, a travelling energy source, driving means for said energy source comprising a threaded drive shaft, a friction disc in operative connected relation with the drive shaft and being rotated thereby, a vacuum pump, a cylinder having a piston operating within the same, a piston rod fixed to the piston and extending exteriorly of the cylinder, said cylinder having communication with the vacuum pump, a brake shoe connected to the piston rod and actuated thereby between a brake applied position and a brake release position, and spring means urging the brake shoe into contact with the friction disc, whereby actuation of the piston rod into a brake applied position will cause the shoe to so engage the friction disc as to retard rotation of the same and thus retard rotation of the drive shaft, and whereby said vacuum pump when operative will effect a retracting movement of the piston, the piston rod and shoe to withdraw the shoe into a brake release position as regards the friction disc.

5. In a vacuum frame type of exposure device, the combination with a vacuum line and a rotatable disc, of friction braking means for the rotatable disc, said means including a cylinder connected at one end to the line and having a closure at its opposite end, a piston within the cylinder, a piston rod fixed to the piston and extending through an opening in the closure, a brake shoe slidably supported by the piston rod for independent movement in an axial direction, resilient means located between the piston rod and brake shoe for yieldingly maintaining the shoe in contact with the disc, and said parts being constructed and arranged whereby the brake shoe is caused to so engage the rotatable disc as to apply a frictional braking action thereto when atmospheric conditions prevail in the vacuum line, and whereby when vacuum conditions prevail within the line the piston rod is retracted to reduce the pressure applied by the resilient means thereby reducing the frictional braking action exerted by the shoe to a frictional drag.

No references cited.

UNITED STATES PATENT OFFICE
CERTIFICATE OF CORRECTION

Patent No. 3,060,827             October 30, 1962

Harold E. Forester et al.

It is hereby certified that error appears in the above numbered patent requiring correction and that the said Letters Patent should read as corrected below.

In the grant, lines 2 to 4, for "assignors, by mesne assignments, to Bell & Howell Company, of Chicago, Illinois, a corporation of Illinois," read -- assignors, by mesne assignments, to Ditto, Incorporated, of Chicago, Illinois, a corporation of Illinois, --; line 13, for "Bell & Howell Company, it successors" read -- Ditto, Incorporated, its successors --; in the heading to the printed specification, lines 4 to 6, for "assignors, by mesne assignments, to Bell & Howell Company, Chicago, Ill., a corporation of Illinois" read -- assignors, by mesne assignments, to Ditto, Incorporated, Chicago, Ill., a corporation of Illinois --.

Signed and sealed this 22nd day of October 1963.

(SEAL)
Attest:

ERNEST W. SWIDER

Attesting Officer

EDWIN L. REYNOLDS

Acting Commissioner of Patents